A. W. NIELSEN.
CAN SOLDERING MACHINE.
APPLICATION FILED JULY 3, 1919.
1,392,964.
Patented Oct. 11, 1921.
6 SHEETS—SHEET 1.
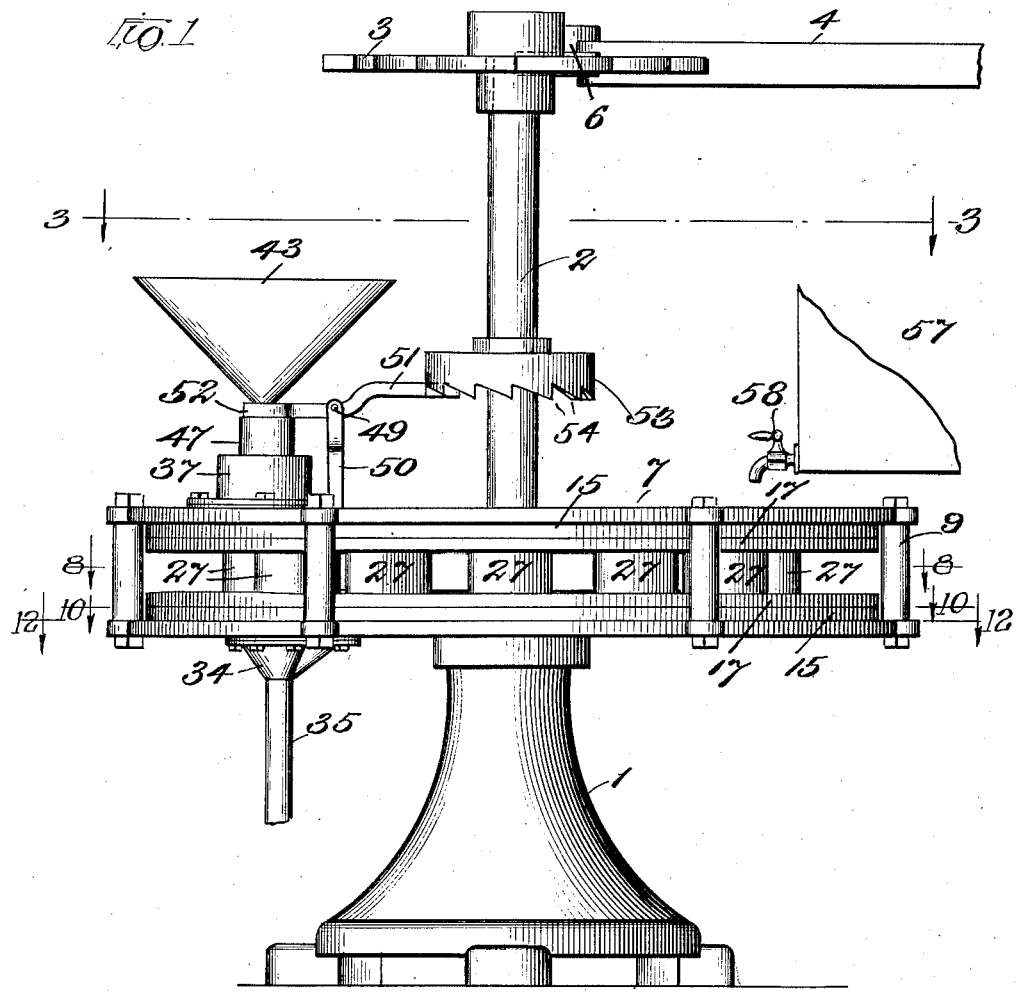
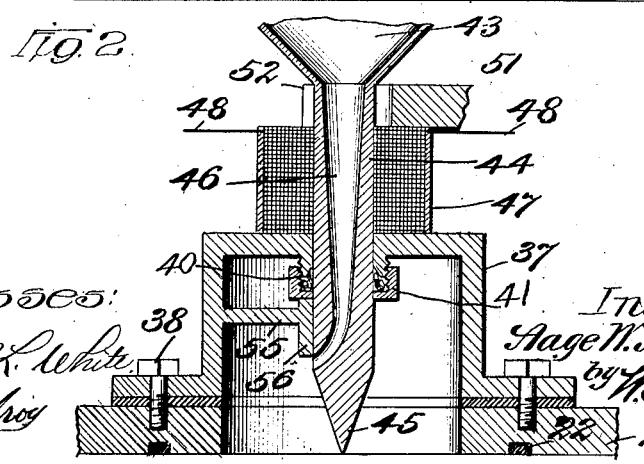

A. W. NIELSEN.
CAN SOLDERING MACHINE.
APPLICATION FILED JULY 3, 1919.
1,392,964.
Patented Oct. 11, 1921.
6 SHEETS—SHEET 2.
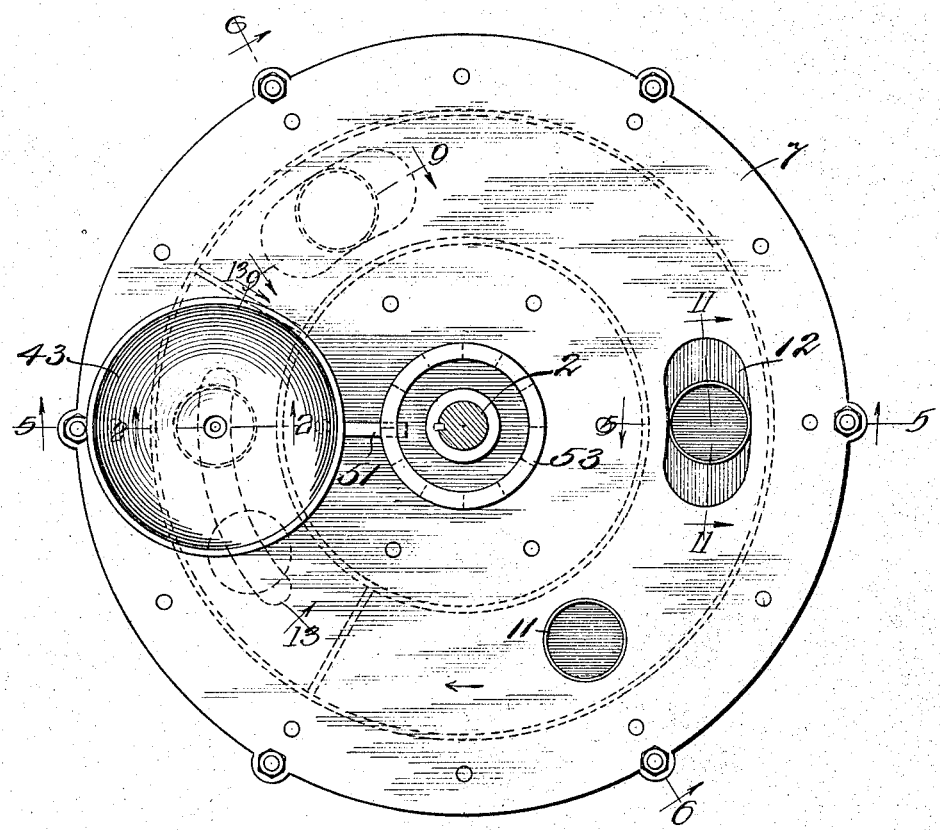
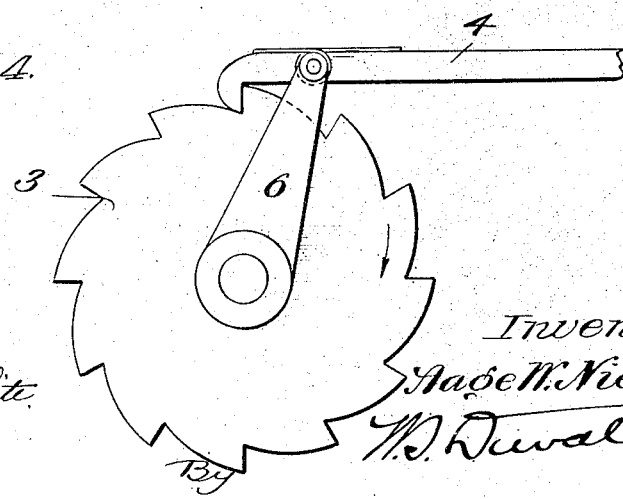

A. W. NIELSEN.
CAN SOLDERING MACHINE.
APPLICATION FILED JULY 3, 1919.

1,392,964.

Patented Oct. 11, 1921.
6 SHEETS—SHEET 3.

Witnesses:
Harry R. Little
W. T. Kilroy

Inventor
Aage W. Nielsen,
By W. J. Duvall, Atty.

A. W. NIELSEN.
CAN SOLDERING MACHINE.
APPLICATION FILED JULY 3, 1919.
1,392,964.
Patented Oct. 11, 1921.
6 SHEETS—SHEET 4.
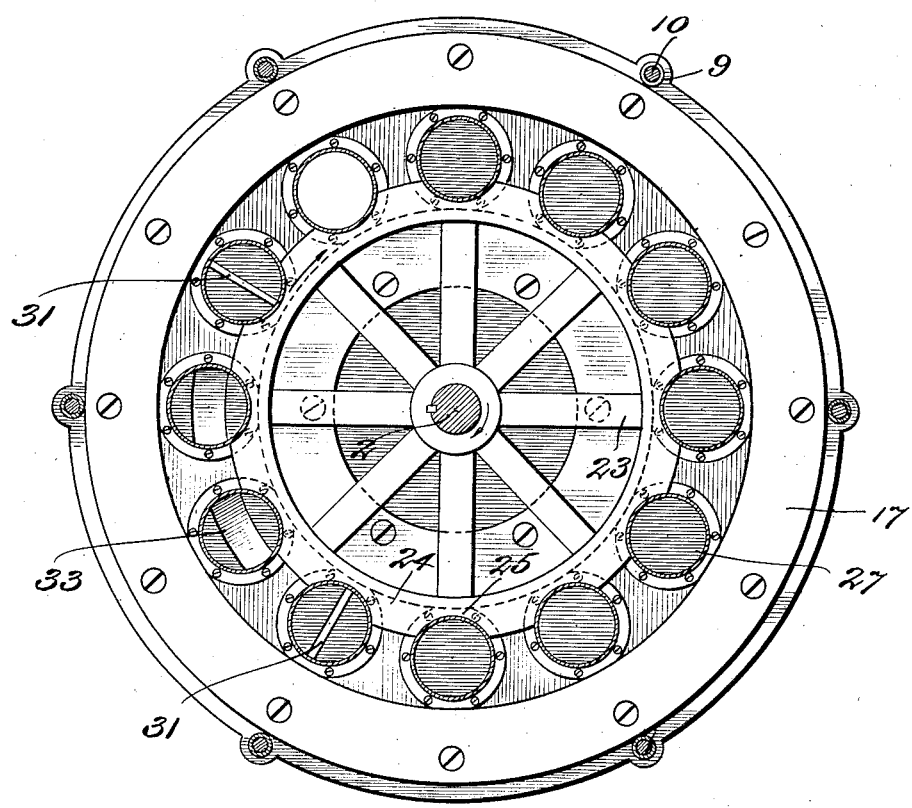
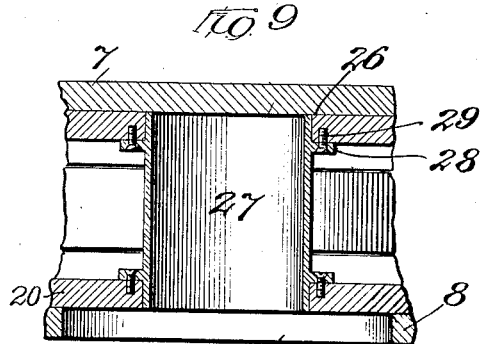

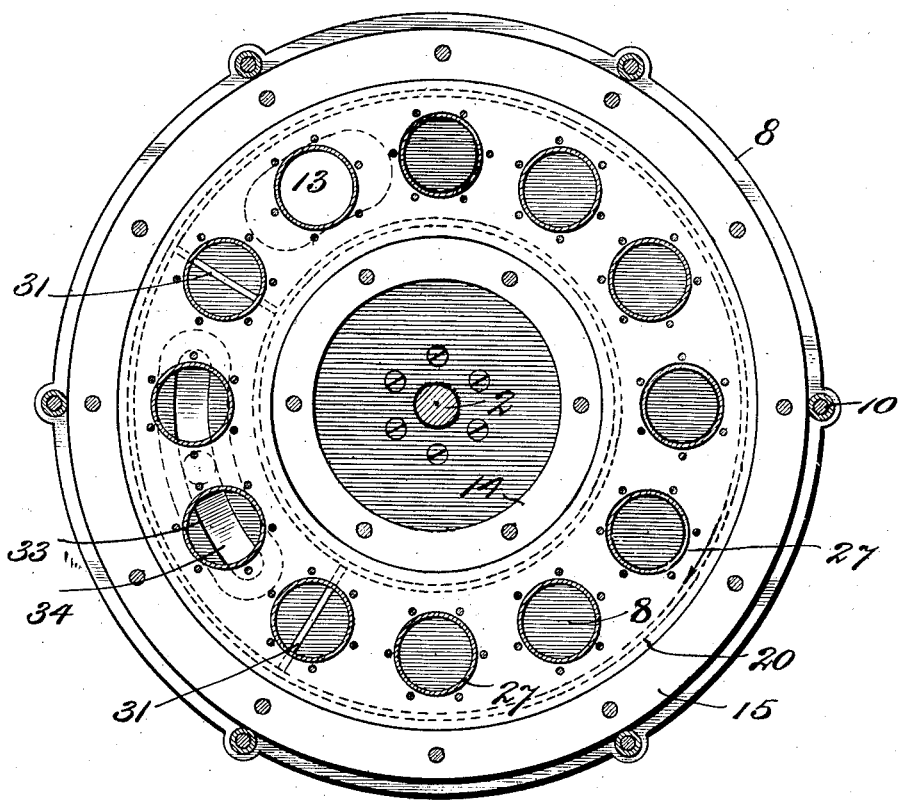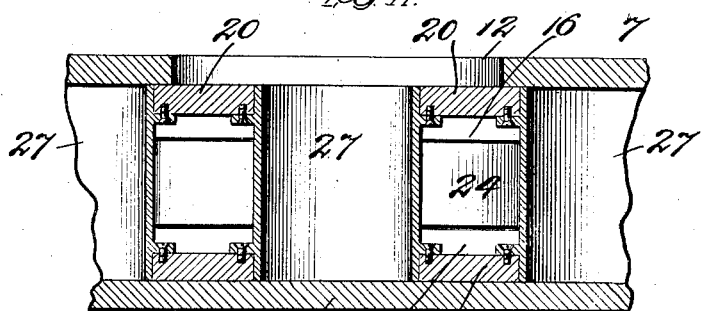

A. W. NIELSEN.
CAN SOLDERING MACHINE.
APPLICATION FILED JULY 3, 1919.
1,392,964.
Patented Oct. 11, 1921.
6 SHEETS—SHEET 6.
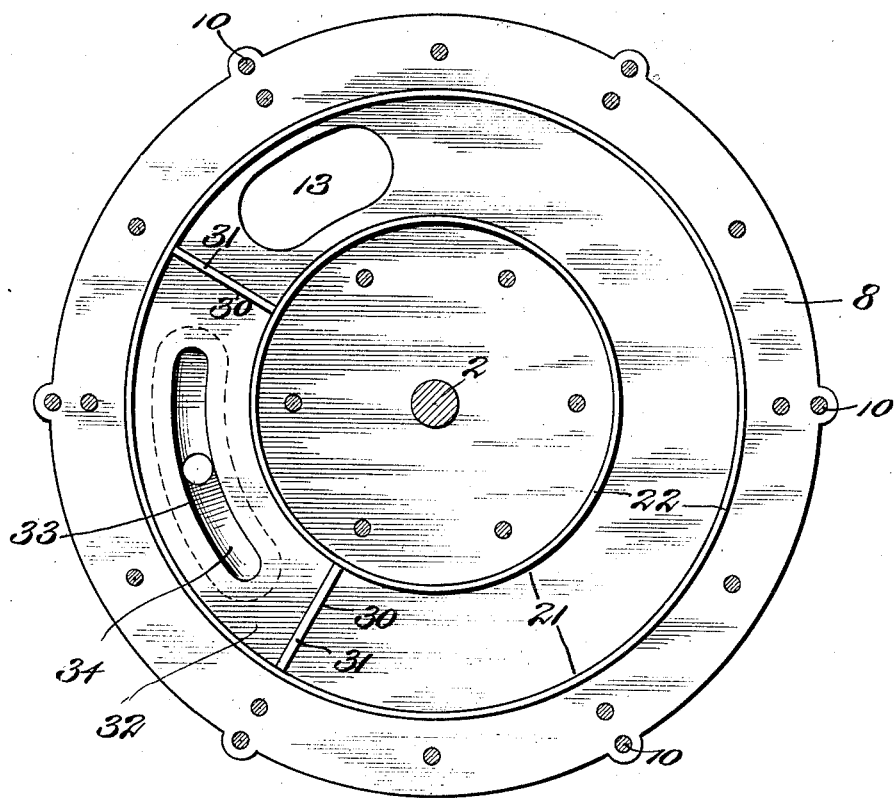
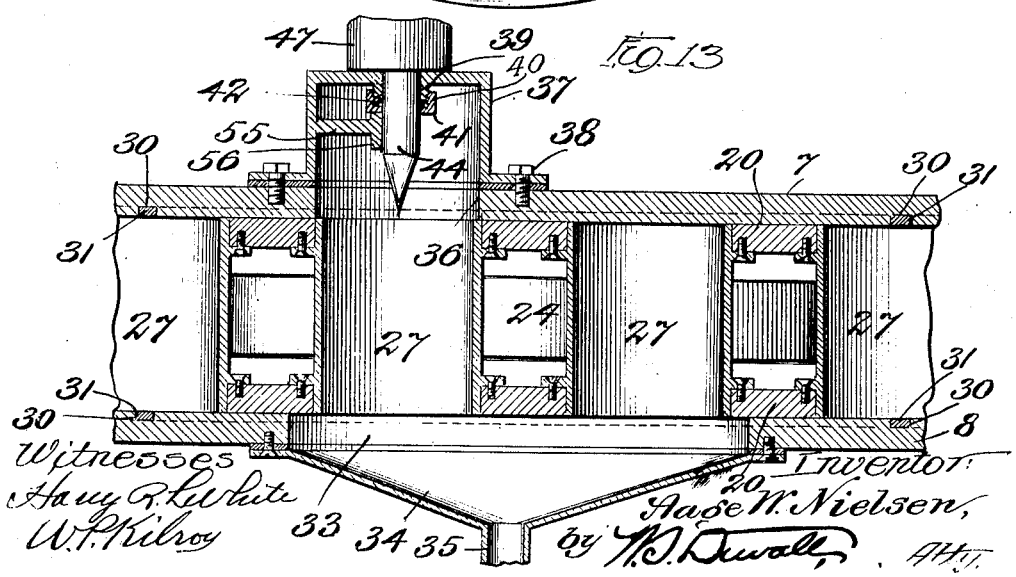

UNITED STATES PATENT OFFICE.

AAGE W. NIELSEN, OF CHICAGO, ILLINOIS.

CAN-SOLDERING MACHINE.

1,392,964.  Specification of Letters Patent.  Patented Oct. 11, 1921.

Application filed July 3, 1919. Serial No. 308,603.

*To all whom it may concern:*

Be it known that I, AAGE W. NIELSEN, a citizen of the United States, residing at Chicago, in the county of Cook and State of Illinois, have invented new and useful Improvements in Can-Soldering Machines, of which the following is a specification.

My invention has for its objects the production of an automatic machine for closing by solder the air-vents in the tops of cans; and the invention consists in the features of construction hereinafter described and particularly pointed out in the claims.

In the drawings, Figure 1, is a side elevation of a machine typifying my invention;

Fig. 2, is a fragmentary sectional view on the line 2—2 of Fig. 3, showing the soldering means;

Fig. 3, is a horizontal sectional view of the machine on the line 3—3 of Fig. 1;

Fig. 4, is a detail plan of the upper end of the drive-shaft and its operating pawl and ratchet;

Fig. 8, is a horizontal sectional view on the line 8—8 of Fig. 1;

Fig. 9, is a fragmentary vertical sectional view on the line 9—9 of Fig. 3;

Fig. 10, is a horizontal sectional view on the line 10—10 of Fig. 1;

Fig. 11, is a vertical fragmentary sectional view on the line 11—11 of Fig. 3;

Fig. 12, is a horizontal sectional view on the line 12—12 of Fig. 1;

Fig. 13, is an enlarged fragmentary vertical sectional view on the line 13—13 of Fig. 3.

Like numerals of reference indicate like parts in all the figures of the drawings.

Figure 5:
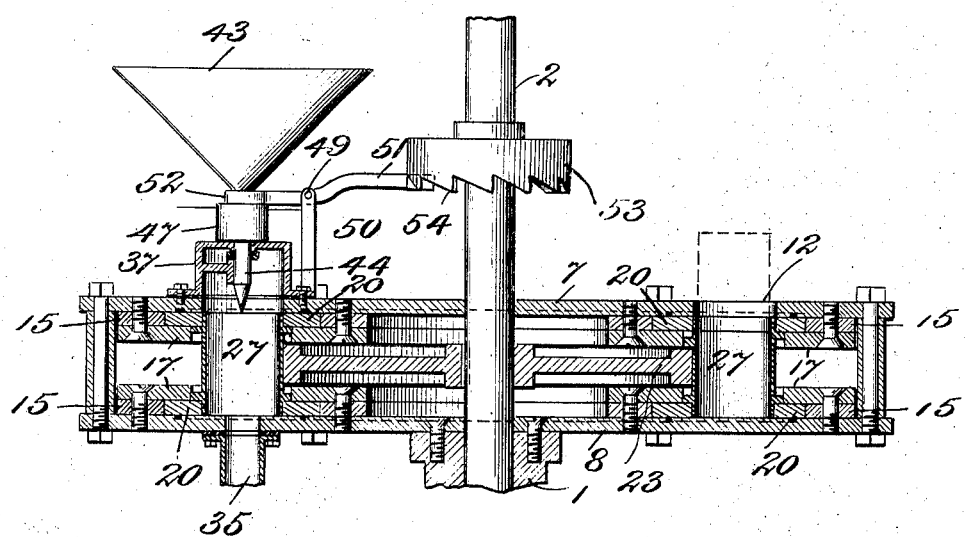
Fig. 5, is a radial vertical sectional view on the line 5—5 of Fig. 3.

My invention primarily comprises a pair of spaced-apart stationary plates, suitably supported, between which travels or rotates the movable can-carrying means, and means for closing (by means of solder) the air-vents in said can-tops between the points of the machine where the cans are received and discharged.

I will now describe in detail a typification of my invention, though it will be understood that I do not limit my invention to the typification illustrated and described, but contemplate other forms that will accomplish the objects of my invention as heretofore mentioned.

Upon a suitable base 1, I mount a vertical drive-shaft 2, the same being mounted in the base preferably so as to intermittently rotate. Such rotation may be accomplished by the means herein shown, which consists of a ratchet-wheel 3, affixed upon the drive-shaft 2, operable by means of a pawl 4, loosely connected to the end of the shaft by a link 6, and adapted to reciprocate.

Immovably mounted upon the base 1, are upper and lower circular plates 7 and 8, respectively, the same having interposed sleeves 9, for spacing them apart, and connecting bolts 10, passing through the sleeves for binding the plates rigidly together.

At one side, the upper plate 7, is provided with a circular opening 11, and a short distance in rear of the same and in annular alinement, with an elongated feed-opening 12. The lower plate 8, is provided with a discharge-opening 13, corresponding to the opening 12 in the upper plate.

Positioned snugly against the inner surfaces of the upper and lower plates 7 and 8, respectively, are inner and outer stationary spacing-rings 14 and 15, respectively, of different diameters, and positioned against the inner faces of these rings are inner and outer clamping-rings 16 and 17, respectively, the inner clamping-rings 16 projecting beyond the outer perimeters of the spacing-rings 14, and the inner edges of the outer clamping-rings 17 projecting inwardly beyond the corresponding perimeters of the outer spacing-rings 15, whereby an annular channel or space 18 is formed between the inner and outer spacing-rings of the plates 7 and 8. The inner and outer spacing-rings of each of the plates 7 and 8, are, together with the inner and outer clamping-rings thereof, secured rigidly together by means of short screw-bolts 19.

Within the upper and lower annular channels or spaces 18, heretofore mentioned as being formed between the spacing-rings 14 and 15 of the plates 7 and 8, are mounted upper and lower rotatable traveling-rings 20, and in order that the same may be in snug contact with the adjacent surfaces of the upper and lower plates 7 and 8, with which they contact, I preferably provide the inner surfaces of the two plates mentioned with inner and outer grooves 21, annularly disposed and corresponding to the recesses 18, for the reception of packing-rings 22.

Keyed to rotate with the drive-shaft 2, at a central point between the upper and lower stationary plates 7 and 8, is a carrier-wheel 23, the rim 24, of which, has its perimeter provided with curved recesses 25, arranged equidistant about the same and corresponding in number with the teeth of ratchet-wheel 3. This wheel 23, is of such diameter as causes the wheel to project somewhat beyond the inner edges of the rotatable traveling-rings 20, and each of the latter is provided with a series of circular openings 26, arranged in vertical alinement and to accord with the curved openings 25 of the wheel 23.

In each of these openings 26, and recesses 25, mentioned, there is mounted an open-ended can-receiving cylinder 27, agreeing in length with the distance between the upper and lower plates 7 and 8, and in diameter with the openings 11, 12 and 13, heretofore described. These cylinders 27, may be secured to the rings 20, by any suitable means, in the present instance, having formed thereon annular flanges 28, which overlap said rings and are bolted thereto by short-screws 29.

The upper and lower plates 7 and 8, are, at a point between the receiving and discharge openings, respectively indicated as 12 and 13, provided with short spaced-apart radial grooves 30, (see Fig. 12), such grooves extending merely between the annular packing-grooves 21, and in said grooves 30, are located radial packings 31, which combine with the annular packings 22, to form upper and lower air-tight compartment 32, of proportions to receive, preferably, three of the can-holding cylinders 27. Below this compartment there is formed in the lower plate 8 of the machine, an opening 33, and communicating with the latter is a connection 34, which, by a pipe 35, is connected to any suitable exhaust-means (not shown), and adapted to exhaust the air from the compartment 32 and any of the can-holding cylinders that pass therethrough.

Formed in the upper plate 7 of the machine, toward the rear end of the exhaust-chamber 32, is an opening 36, the diameter of which agrees with the cylinders 27. Surmounting the opening 36, covering the same, and bolted to the plate 7, as at 38, is a flanged-cap 37, in the upper side of which is formed a central opening 39, having a surrounding depending threaded flange or collar 40, adapted to receive a gland-nut 41, carrying a packing 42, all as best illustrated in Fig. 13.

Surmounting the cap 38, is a receptacle or hopper 43, (see Fig. 2), designed for the reception of the soldering-material. At the lower end of the receptacle or hopper is a soldering-iron 44, which is adapted to reciprocate in the opening 39 in the cap or dome, and terminates in a soldering point 45, coincident with the center of the cap and any cylinder 27 that is below the opening. The soldering-iron is formed, in this instance, with a tapered bore or passage 46, leading from the receptacle or hopper 43, to a point above the lower end of the iron the said bore or tapered passage of the iron being closed by the solder therein. Surrounding the soldering-iron, and below the hopper, is an electrical heater 47, the wires 48 of which may lead from any source of electrical supply.

Pivoted as at 49, at the upper end of a standard 50, rising from the plate 7 in proximity to the cap 37, is a vibratory lever 51, the outer end of which may be bifurcated as at 52, to engage under the receptacle or hopper 43. The inner end of the lever 51 engages under a disk 53, rigid with the drive-shaft 2, the disk having its under side provided with inclined cam-teeth 54, over which the tail-end of the lever 51 is designed to ride as the drive-shaft is rotated, whereby, as will be obvious, the lever 51 is vibrated and the receptacle 43 and soldering-iron 44 carried thereby, are vertically reciprocated, these reciprocations being timed so as to synchronize with other operations of the machine, all as will hereinafter appear.

An arm 55, extends inwardly from the wall of the cap 37, and carries at its inner end a closure or cut-off (in this instance, merely a flange 56), designed to cut off the flow of solder at the lower or discharge end of the passage 46 in the soldering-iron when the iron is raised.

Supported over the opening 11, of the plate 7, may be a flux-receptacle 57, provided with a discharge 58, coincident with the center of the opening 11.

This completes the construction of the present typification of my invention, and I will now proceed to briefly describe its operation.

Figure 6:
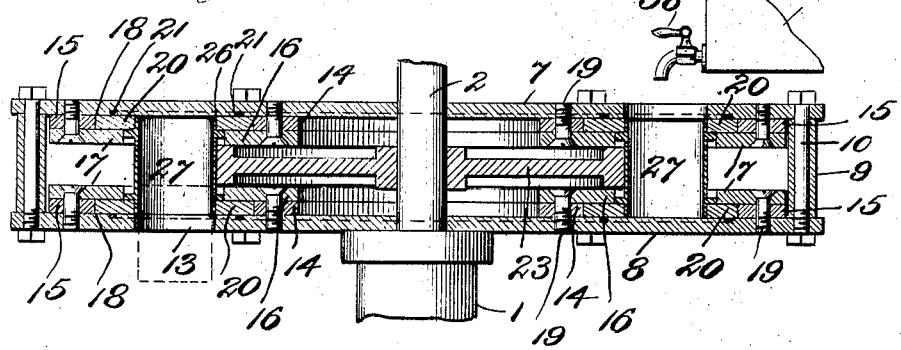
Fig. 6, is a similar view on the line 6—6 of Fig. 3.
Figure 7:
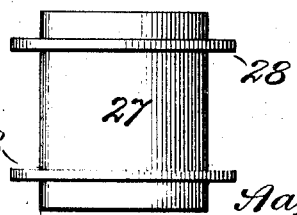
Fig. 7, is a side elevation in detail of one of the can-holders.

The machine being set in motion, it will be observed, will operate or revolve intermittently or step-by-step, so that the cylinders 27 are successively brought under the feed-opening 12 as the ratchet-wheel 3 is rotated the distance of a tooth. As these cylinders are brought under the opening 12, filled cans are placed in the cylinders. In order to permit of the introduction of the cans in the cylinders, the feed-opening 12 is, as before stated, made elongated, whereby some little time is consumed by each cylinder in passing from under said feed-opening. In Fig. 5, I have illustrated by dotted lines, a can in the act of being introduced through the feed-opening 12 into a coincident cylinder 27, and in Fig. 6, I have illustrated by the same means, a can in the act of being discharged from the machine through the elongated discharge-opening 13, which like the feed-opening, is also elongated for the same purpose.

Subsequent to its introduction, the can is carried, step-by-step by the carrier-wheel 23 under the discharge 58 of the receptacle 57, which latter is merely a container for preferably some liquid soldering-flux, a drop of the latter falling upon the unsealed vent in the can. The can now passes into the vacuum-chamber 32, the air being quickly exhausted from the can after entering the chamber. As stated, the vacuum-chamber is preferably sufficiently long to accommodate three cans, so that by the time the can reaches a point below the soldering-iron it will be in complete vacuum. At this point, through a suitable timing of the mechanism, the soldering receptacle and soldering-iron is lowered to a point directly over and in contact with the unsealed vent in the top of the can. This lowering of the soldering-iron uncovers the lower end of the discharge passage 46, so that a drop of solder follows the iron to its point and becomes deposited thereby over and thus closes the vent in the top of the can, said solder readily adhering to the can-top by reason of the previously deposited flux. The machine then advances a step and the next succeeding can comes under the soldering-iron and the operation is repeated, the cans dropping out of the discharge-opening 13 automatically as they reach this point in the machine. After the operation of soldering a can the soldering-iron and the receptacle are automatically raised to make way for the next can and such raising serving to close the soldering-passage 46 in the iron. As soon as the lever 51 is released the iron and receptacle descend with a jolt sufficient to discharge the necessary drop of solder.

From the foregoing description it will be apparent that the small air-vents left in can-tops and which are usually closed by hand labor may be rapidly, effectually and automatically closed by machine.

Through the adjustment of the binding-bolts 10, all leakage between the movable and stationary parts thereof, may be overcome; so also, may the parts be separated for the installation of new packings, etc.

Having described my invention, what I claim, is:

1. The combination, in a machine of the class described, of upper and lower stationary plates, the upper plate being provided with a feed-opening and the lower plate with a discharge-opening, a shaft passing through the plates and provided with means for rotation, a rotatable carrier mounted upon and adapted to move with the shaft and provided with means for supporting cans and conducting them from the feed-opening to the discharge-opening of the machine, a solder-supply located above the upper plate between said feed and discharge-openings, a soldering-means connected with said supply and extending through said upper plate in advance of the discharge-opening, and means for discharging solder from the soldering-means as cans are successively brought thereunder.

2. The combination, in a machine of the class described, of upper and lower stationary plates, the upper plate being provided with a feed-opening and the lower plate with a disharge-opening, a shaft passing through the plates and provided with means for rotation, a rotatable carrier mounted upon and adapted to move with the shaft and provided with means for supporting cans and conducting them from the feed-opening to the discharge-opening of the machine, a soldering-supply located adjacent the machine, a tubular soldering-iron connected to the solder-supply and extending through said upper plate in advance of the discharge-opening, and means for opening and closing the lower end of the tubular soldering-iron as said cans are successively presented thereunder by the rotatable carrier.

3. The combination, in a machine of the class described, of upper and lower stationary plates, the upper plate being provided with a feed-opening and the lower plate with the discharge-opening, a shaft passing through the plates and provided with means for causing an intermittent rotation thereof, a carrier mounted upon and adapted to move with the shaft and between said plates, said carrier having means for supporting can in annular alinement with the feed and discharge-openings of the machine, a soldering supply located adjacent the machine, a tubular soldering-iron, connected with the supply and mounted for reciprocation in the upper plate in annular alinement with the path of the cans, and means for reciprocating said iron so as to lower the same into contact with the cans as they are successively presented thereunder and for cutting off the supply of solder when said soldering-iron is raised.

4. The combination, in a machine of the class described, of upper and lower stationary plates, the upper plate being provided with a feed-opening and the lower plate with a discharge-opening, a shaft passing through the plates and provided with means for causing intermittent rotation, a rotatable carrier mounted upon and adapted to move with the shaft and provided with means for supporting cans and conducting them from the feed-opening to the discharge-opening of the machine, a solder supply located adjacent the machine, a soldering-iron mounted for reciprocation in the upper plate, means for lowering said iron as the cans are successively brought under the same, a solder conducting means leading from the solder supply to the point of the iron, and means for discharging solder to the iron as the latter is lowered.

5. The combination, in a machine of the class described, of upper and lower stationary plates, the upper plate being provided with a feed-opening and the lower plate with a discharge-opening, a shaft passing through the plates and provided with means for causing intermittent rotation, a carrier mounted between the two plates upon the shaft and provided with means for supporting cans and conducting them from the feed-opening to the discharge-opening of the machine, a solder-supply adjacent the machine, a soldering-iron having a bore and a discharge near its lower end mounted to reciprocate in the upper plate in annular alinement with the path of the cans, means for reciprocating said iron so as to lower the same at each presentation of a can thereunder, and a stationary cut-off for said solder in contact with said iron and positioned with relation to the solder-discharge of the iron so as to close the same when said iron is elevated.

6. The combination, in a machine of the class described, of upper and lower stationary plates, the upper plate being provided with a feed-opening and the lower plate with a discharge-opening, a shaft passing through the plates and provided with means for causing intermittent rotation, a rotatable carrier mounted upon the shaft and provided with means for supporting cans and conducting them from the feed-opening to the discharge-opening of the machine, a solder supply above the machine, a soldering-iron mounted for reciprocation in the upper plate in annular alinement with the path of the cans and provided with a bore having a discharge near the point of the iron, a vibratory lever fulcrumed adjacent the iron and connected therewith loosely, and a cam-disk carried by the shaft and operating to raise and lower said lever at each intermittent movement of the shaft.

7. The combination, in a machine of the class described, of upper and lower stationary plates, the upper plate being provided with a feed-opening and the lower plate with a discharge-opening, a shaft passing through the plates and provided with means for causing intermittent rotation, a rotatable carrier mounted upon and adapted to move with the shaft between the two plates and provided with means for supporting cans and conducting them from the feed to the discharge-opening of the machine, a bored soldering-iron mounted for reciprocation in an opening formed in the upper plate in advance of the discharge-opening, said iron having a discharge-port adjacent its lower end, a stationary cut-off covering said port when the iron is elevated, a solder supply at the upper end of the iron, and means operated by the shaft for elevating the iron and solder supply and releasing the same so as to fall by gravity as each can is successively presented under said iron.

8. The combination, in a machine of the class described, of upper and lower stationary plates provided with feed and discharge-openings, a rotary can-carrier mounted between the plates and provided with can-carrying means alining with said openings, a flux-supply having a discharge terminating above an opening formed in the upper plate in rear of the feed-opening, a soldering-iron mounted to reciprocate and positioned in the upper plate in advance of said discharge-opening, a solder-supply having a discharge leading to the iron, a cut-off for the solder-supply, and means for synchronously advancing the carrier reciprocating the soldering-iron and opening the solder-discharge.

9. The combination, in a machine for the purpose described, of upper and lower spaced-apart stationary plates, a feed-opening in one of said plates, a non-alining discharge-opening in annular alinement with the feed-opening formed in the lower plate, a shaft rotatably mounted in the plates, a carrier mounted upon and adapted to rotate with the shaft and provided with can-receiving cylinders in annular alinement with said feed and discharge-openings, and soldering means located above and between said feed and discharge-openings and in annular alinement with the centers thereof, means for intermittently rotating the shaft and its carrier and for operating the soldering-means when the can-receiving means of the carrier arrive thereunder.

10. The combination, in a machine of the class described, of upper and lower spaced-apart plates each provided upon its inner surface with an annular channel, the upper plate having a feed-opening and the lower plate a discharge-opening, both coincident with the channel, rings mounted to travel in each of said channels, said rings having vertically alining openings coincident with the openings in the plates, can-receiving cylinders mounted in said openings of the rings and connecting the latter, a shaft rotatably mounted in the plates, a rotatable carrier mounted on the shaft, adapted to move therewith and having recesses in its perimeter engaging the can-receiving cylinders, a soldering-means located in the path of said can-receiving cylinders, and means for intermittently rotating the shaft and for simultaneously operating the can-soldering means.

11. The combination, in a machine of the class described, of upper and lower spaced-apart plates, each provided upon its inner face with an annular channel the upper plate having a feed-opening and the lower plate having a discharge-opening, both coincident with the channel, rings mounted to travel in each of said channels and provided with vertically alining openings cylinders mounted in said openings, connecting said rings, and having external flanges secured to the rings, a vertical rotatable shaft passing through the plates, a rotatable carrier mounted on and adapted to move with the shaft and recessed to receive the cylinders, a soldering-iron in the path of the cylinders, a solder-supply connected to the iron, a cut-off for the same, a cam-faced ratchet-disk carried by the shaft and having teeth agreeing in number with the cylinders, a vibratory lever fulcrumed adjacent the soldering-iron and supporting the same and extending at its opposite end under the cam-teeth of the disk.

12. The combination, in a machine of the class described, of upper and lower plates, having respectively feed and discharge openings, a vacuum-chamber located in annular alinement with and between said openings, a soldering-iron located above and extending into said chamber, and means for feeding cans successively into and out of said chamber and for operating the soldering-iron as said cans are successively presented thereunder.

13. The combination, in a machine of the class described, of upper and lower plates provided at their inner sides with annular channels, rings mounted to travel in said channels and having alining openings, can-receiving cylinders mounted in the openings of the rings and connecting the latter, feed and discharge-openings formed respectively in the upper and lower plates in annular alinement with said cylinders, packings between the rings and plates and parallel to the channel, radial packings spaced-apart and connecting the annular packings, whereby to form a vacuum chamber, an exhaust means connected to said chamber, a soldering-iron mounted in the chamber, a solder-supply, and means for conducting to and discharging solder from said iron.

AAGE W. NIELSEN.